United States Patent
Jiang et al.

(10) Patent No.: US 11,853,151 B1
(45) Date of Patent: Dec. 26, 2023

(54) TASK ABNORMALITY DETECTION SYSTEM AND EMBEDDED DEVICE DETECTION METHOD

(71) Applicant: Realtek Semiconductor Corporation, Hsinchu (TW)

(72) Inventors: Siwei Jiang, Jiangsu Province (CN); Kun-Hsuan Wu, Hsinchu (TW); Hong Zhang, Jiangsu Province (CN); Shuyu Deng, Jiangsu Province (CN)

(73) Assignee: Realtek Semiconductor Corporation, Hsinchu (TW)

( * ) Notice: Subject to any disclaimer, the term of this patent is extended or adjusted under 35 U.S.C. 154(b) by 0 days.

(21) Appl. No.: 18/165,925

(22) Filed: Feb. 7, 2023

(30) Foreign Application Priority Data

Nov. 16, 2022 (CN) .......................... 202211435780.3

(51) Int. Cl.
*G06F 11/00* (2006.01)
*G06F 11/07* (2006.01)
*G06F 11/28* (2006.01)

(52) U.S. Cl.
CPC ........ *G06F 11/079* (2013.01); *G06F 11/0736* (2013.01); *G06F 11/0793* (2013.01); *G06F 11/28* (2013.01)

(58) Field of Classification Search
CPC ............. G06F 11/0703; G06F 11/0706; G06F 11/0736; G06F 11/0751; G06F 11/0766; G06F 11/0772; G06F 11/0778; G06F 11/079; G06F 11/0793; G06F 9/321; G06F 9/327; G06F 9/328; G06F 9/3557; G06F 9/38; G06F 9/3861; G06F 11/28
See application file for complete search history.

(56) References Cited

U.S. PATENT DOCUMENTS

| 8,020,154 B2 * | 9/2011 | Barraclough ....... G06F 9/30174 717/130 |
| 2009/0132853 A1 * | 5/2009 | Ferren ................. G06F 11/0721 714/E11.178 |

FOREIGN PATENT DOCUMENTS

| CN | 101211309 A | * | 7/2008 |
| CN | 114691481 A | * | 7/2022 |

* cited by examiner

*Primary Examiner* — Anthony J Amoroso
(74) *Attorney, Agent, or Firm* — CKC & Partners Co., LLC

(57) ABSTRACT

An embedded device detection method, comprising the following steps: executing a task by an embedded device, wherein the task comprises multiple functions; when an abnormal interruption occurs to the task, obtaining a stack pointer and a program counter corresponding to the abnormal interruption by a detection device, wherein the program counter is configured to record a memory address in use when the abnormal interruption occurs to the task; obtaining a stack space corresponding to a first target function being executed according to the program counter when the abnormal interruption occurs to the task; finding out a second target function before the first target function is executed according to the stack pointer and the stack space; and correcting the task according to the second target function.

11 Claims, 9 Drawing Sheets

```
[BOOT] Hard Fault Error!
[BOOT] R0 = 0x20000000, R1 = 0x40012000, R2 = 0x40011000, R3 = 0x40024000
[BOOT] R4 = 0x2C8490, R5 = 0x6F100300, R6 = 0x1F510, R7 = 0x0
[BOOT] R8 = 0x0, R9 = 0x1, R10 = 0x5, R11 = 0x1518
[BOOT] R12 = 0x40011000, LR = 0x1959, PC = 0xA7DA, PSR = 0x1000000, SP = 0x2C8468
[BOOT] MSP = 0x289370, PSP = 0x2c8448, PRIMASK = 0x0, BASEPRI = 0x0, EXC_RETURN = 0x
[BOOT] CFSR = 0x0, HFSR = 0x80000000, DFSR = 0x0, AFSR = 0x0
[BOOT] [Mem Dump]SRAM from addr 0x200000
```

| | | | |
|---|---|---|---|
| PPB_Init_DLPS_Restore | 0x0000a58b | Thumb Code | 50 | pingpong_buffer.o(.text) |
| Encode | 0x0000a5bd | Thumb Code | 160 | pingpong_buffer.o(.text) |
| PPB_Write_rom | 0x0000a65d | Thumb Code | 196 | pingpong_buffer.o(.text) |
| platform_assert_dump | 0x0000a735 | Thumb Code | 172 | platform_utils.o(.text) |
| platform_random | 0x0000a7e1 | Thumb Code | 26 | platform_utils.o(.text) |
| check_identical | 0x0000a7fb | Thumb Code | 16 | platform_utils.o(.text) |
| clk_cnt_cmp | 0x0000a80b | Thumb Code | 58 | platform_utils.o(.text) |

F1 points to platform_assert_dump row.

[Address Reference Count : 1]
patch_platform.o(.data)
platform_assert_dump (Thumb, 172 bytes, Stack size 40 bytes, platform_utils.o(.text))

[Stack]
Max Depth = 320
Call Chain = platform_assert_dump --> trace_string --> strlen

Fig. 3C

|            |          |          |          |          |          |          |                        |
|------------|----------|----------|----------|----------|----------|----------|------------------------|
| 0x002c8420: | 08808480 | 002c8490 | 0000017e | 00001f510 | 00000000 | 002c8490 | 00001f510 | 02-17#15:49:30.534 |
| 0x002c8440: | 00000000 | 00000000 | 20000000 | 40012000 | 40011000 | 40024000 | 00001959 | 02-17#15:49:30.534 |
| 0x002c8460: | 0000a7da | 01000000 | 002c8490 | 00000000 | 00000002 | 61000000 | 61000000 | 02-17#15:49:30.534 |
| 0x002c8480: | 00000000 | 00000002 | 00000000 | 0000088c5 | 00000000 | 00000000 | 00000000 | 02-17#15:49:30.534 |
| 0x002c84a0: | 00281740 | 00000000 | 0021c064 | 0028812b4 | 021c018 | 0212df6d | 00000001 | 02-17#15:49:30.534 |
| 0x002c84c0: | 00000005 | 00001518 | 000080e91 | 00017bf7 | 00000000 | 0021c018 | 000151f5 | 02-17#15:49:30.534 |

Fig. 3D

FS prvTaskExitError (src file: port.c) LR_addr:0x00017545
|---> app_task (src file: app_main.c) LR_addr:0x020b1be5
    |---> gap_handle_msg (src file: gap_common.c) LR_addr:0x0204aed1
        ....
        |---> osif_msg_queue_delete (src file: osif_freertos.c) LR_addr:0x000198bb
            |---> vQueueDelete (src file: queue.c) LR_addr:0x000151f5
                |---> vPortFree_rom (src file: heap_5.c) LR_addr:0x00017bf7           F2
                    |---> vAssertHandler (src file: platform_utils.c) LR_addr:0x000088c5      F1
                        |---> platform_assert_dump (src file: platform_utils.c) LR_addr:0x00001959

Fig. 3E

```
int func_B(int arg_B1, int arg_B2)              ~F1
{
  int var_B1;
  int var_B2;
  var_B1 = arg_B1 + arg_B2;
  var_B2 = arg_B1 - arg_B2;
  return var_B1 * var_B2;
}
```

```
int func_A(int arg_A1, int arg_A2)              ~F2
{
  int var_A;
  var_A = func_B(arg_A1, arg_A2) + arg_A1;
  return var_A;
}
```

```
int main(int argc, char ** argv, char** envp)   ~F0
{
  int var_main;
  var_main = func_A(3, 4);
  return 0;
}
```

Fig. 4

TASK ABNORMALITY DETECTION SYSTEM AND EMBEDDED DEVICE DETECTION METHOD

CROSS-REFERENCE TO RELATED APPLICATION

This application claims priority to China Application Serial Number 202211435780.3, filed Nov. 16, 2022, which is herein incorporated by reference in its entirety.

BACKGROUND

Technical Field

The present disclosure relates to a processing and analysis when a task is abnormally interrupted, especially a task abnormality detection system and an embedded device detection method.

Description of Related Art

Embedded system is a system for specific functions, setting specific processing circuit inside a device and pre-programmed firmware to control, monitor or assist the operation of the device. Since the embedded system is only used to perform preset tasks and functions, it can be more easily optimized, such as reducing size or cost. However, such "embedded devices" equipped with an embedded system are not easy to perform comprehensive detection because the system environment is relatively closed.

SUMMARY

One aspect of the present disclosure is an embedded device detection method, comprising: executing a task, by an embedded device, wherein the task comprises a plurality of functions; when an abnormal interruption occurs to the task, obtaining, by a detection device, a stack pointer and a program counter corresponding to the abnormal interruption, wherein the program counter is configured to record a memory address in use when the abnormal interruption occurs to the task; obtaining a stack space corresponding to a first target function being executed when the abnormal interruption occurs to the task according to the program counter; finding a second target function before the first target function is executed according to the stack pointer and the stack space; and correcting the task according to the second target function.

Another aspect of the present disclosure is a task abnormality detection system, comprising an embedded device and a detection device. The embedded device comprises a processor and a memory unit. The processor is configured to execute a task, the task comprises a plurality of functions. The detection device is coupled to the embedded device, and is configured to receive a status file to obtain a stack pointer and a program counter when an abnormal interruption occurs to the task. The detection device is further configured to obtain a stack space corresponding to a first target function being executed when the abnormal interruption occurs to the task according to the program counter. The detection device is further configured to find a second target function before the first target function is executed according to the stack pointer and the stack space to correct the task.

Another aspect of the present disclosure is an embedded device detection method, comprising: executing a task, by an embedded device, wherein the task comprises a plurality of functions; when an abnormal interruption occurs to the task, recording, by the embedded device, a operating status of the embedded device as a status file; obtaining, by a detection device, a stack pointer and a program counter corresponding to the abnormal interruption from the status file, wherein the program counter is configured to record a memory address in use when the abnormal interruption occurs to the task; identifying a first target function being executed when the abnormal interruption occurs to the task according to the program counter; finding a second target function before the first target function is executed according to the stack pointer; and correcting the task according to the second target function.

It is to be understood that both the foregoing general description and the following detailed description are by examples, and are intended to provide further explanation of the disclosure as claimed.

BRIEF DESCRIPTION OF THE DRAWINGS

The present disclosure can be more fully understood by reading the following detailed description of the embodiment, with reference made to the accompanying drawings as follows:

FIG. 3A is a partial schematic diagram of a status file in some embodiments of the present disclosure.

FIG. 3B is a partial schematic diagram of a mapping file in some embodiments of the present disclosure.

FIG. 3C is a partial schematic diagram of a list file in some embodiments of the present disclosure.

FIG. 3D is a partial schematic diagram of a status file in some other embodiments of the present disclosure.

FIG. 3E is a schematic diagram of a function calling sequence in some embodiments of the present disclosure.

FIG. 4 is a schematic diagram of a task content in some embodiments of the present disclosure.

DETAILED DESCRIPTION

For the embodiment below is described in detail with the accompanying drawings, embodiments are not provided to limit the scope of the present disclosure. Moreover, the operation of the described structure is not for limiting the order of implementation. Any device with equivalent functions that is produced from a structure formed by a recombination of elements is all covered by the scope of the present disclosure. Drawings are for the purpose of illustration only, and not plotted in accordance with the original size.

It will be understood that when an element is referred to as being "connected to" or "coupled to", it can be directly connected or coupled to the other element or intervening elements may be present. In contrast, when an element to another element is referred to as being "directly connected" or "directly coupled," there are no intervening elements present. As used herein, the term "and/or" includes an associated listed items or any and all combinations of more.

Figure 1:
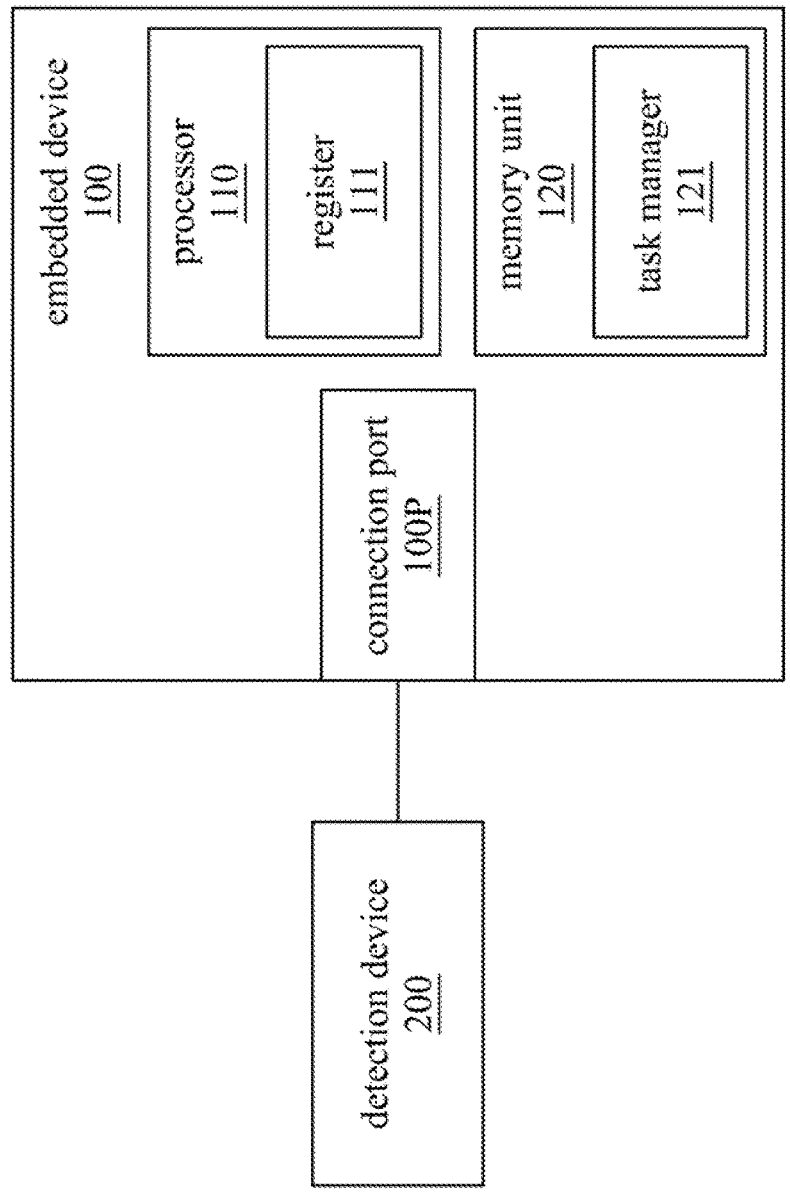
FIG. 1 is a schematic diagram of a task abnormality detection system in some embodiments of the present disclosure.

FIG. 1 is a schematic diagram of a task abnormality detection system S in some embodiments of the present disclosure. The task abnormality detection system S include an embedded device 100 and a detection device 200. The embedded device 100 has a connection port 100P, such as Universal Serial Bus. The detection device 200 is coupled to the embedded device 100 through the connection port 100P for data transmission.

The embedded device 100 include at least a processor 110 and a memory unit 120. In one embodiment, the processor 110 include one or more pre-programmed microcontrollers that are configured to perform specific tasks. The memory unit 120 is coupled to the processor 110, and is installed with one or more firmwares, so that the processor 110 can execute different tasks according to requirements. Each task includes one or more functions.

In one embodiment, the processor 110 is configured to execute various operations, and can be implemented as a microcontroller, microprocessor, digital signal processor, application specific integrated circuit (ASIC) or logic circuit. The memory unit 120 can be implemented as a read-only memory, flash memory, hard disk, flash drive, database accessible from the network, or a storage medium or circuit with the same function can be easily imagined by those skilled in the art.

In some embodiments, the processor 110 of the embedded device 100 belongs to ARM (Advanced RISC Machine) architecture, and the system installed in the memory unit 120 is FreeRTOS. As shown in FIG. 1, in one embodiment, a register 111 (Link Register) in the processor 110 is configured to store a corresponding address of the currently executing program (task or function). Corresponding addresses of other programs are stored in a task manager 121 in the memory unit 120.

The embedded device 100 can use an emulator to simulate software or hardware functions to determine whether the embedded device 100 is executing correctly. However, for some production lines, the industry will close the connection port or pin for detection due to safety considerations, so that the emulator cannot be used for detection. The present disclosure uses a status file received when the abnormal interruption occurs to the embedded device 100 and analyzes the status file, so as to find an objective function related to the abnormality, so that the detector can correct the embedded device accordingly.

When the processor 110 starts to execute a task or a function therein, the processor 110 allocates a storage space of a corresponding size to the corresponding task/function to store various variables when the task/function is executing. According to different data allocation methods, the allocated storage spaces can be classified into "Stack" and "Heap." Stack is a static memory configuration with a fixed size. Heap is a dynamic memory allocation. During a compilation time, if the processor 110 cannot ensure a space size required to execute the task, the processor 110 will allocate heaps in the memory unit 120 for use by the task or the function.

The detection device 200 is coupled to the embedded device 100, and is configured to detect whether the embedded device 100 is executing normally, or detects whether an abnormal interruption occurs. "Abnormal interruption" means that a processing program of the embedded device 100 has not been completed. For example, an internal event of the processor 110 or other instructions of an external device conflict with the processing program. At this time, the abnormal interruption may occur, so that correct output result cannot be produced according to an original input instruction. For example, when the embedded device 100 executes a specific task according to the input instruction, the detection device 200 obtains an internal operation data of the embedded device 100 to determine whether the abnormal interruption occurs to the embedded device 100 (i.e., the abnormal interruption occurs to the task.)

When the abnormal interruption occurs to the task executed by the embedded device 100, the detection device 200 receives a status file from the embedded device 100, and obtain a stack pointer and a program counter according to the status file.

The stack pointer is configured to indicate an address of storing data in a stack. Since storage method of stack is "Last In, First Out", the stack pointer will indicate a top space of the stack. The program counter is configured to record an address in use when an abnormal interruption occurs to the task.

After obtaining the stack pointer and the program counter, the detection device 200 identifies and obtains a first target function being executed when an abnormal interruption occurs and a corresponding stack space according to the program counter. Then, the detection device 200 finds a second target function before the first target function is executed according to the stack pointer and the stack space. Similarly, the detection device 200 can find a third target function before the second target function in the same way.

Since the abnormal interruption must be occurred by an error in execution or call of a function, and the last executed function has a higher probability of errors, the detection device 200 will start from the last function (i.e., the first target function) and analyze forward one by one to find a function calling sequence between multiple functions. The detector or the program developer can confirm by the detection device 200 whether there is an abnormality or error in the function calling sequence to correct tasks executed in the embedded device 100, so as to avoid subsequent occurrence of the abnormal interruption.

When the abnormal interruption occurs to the task executed by the embedded device 100, the present disclosure records an operating status of the embedded device as a status file. The aforementioned "operating status" may include memory information, register status, stack/heap address list, relative relationship of function calling, etc. The status file can reflect an internal information of the memory unit 120. The detection device 200 identifies a corresponding stack pointer and a program counter by analyzing the status file when the abnormal interruption occurs to the task executed by the embedded device 100. Accordingly, it will be able to accurately find the first target function being executed when the abnormal interruption occurs, and it can be calculated forward according to the first target function to find reason of the abnormal interruption occurs to the task, and correct it.

Figure 2:
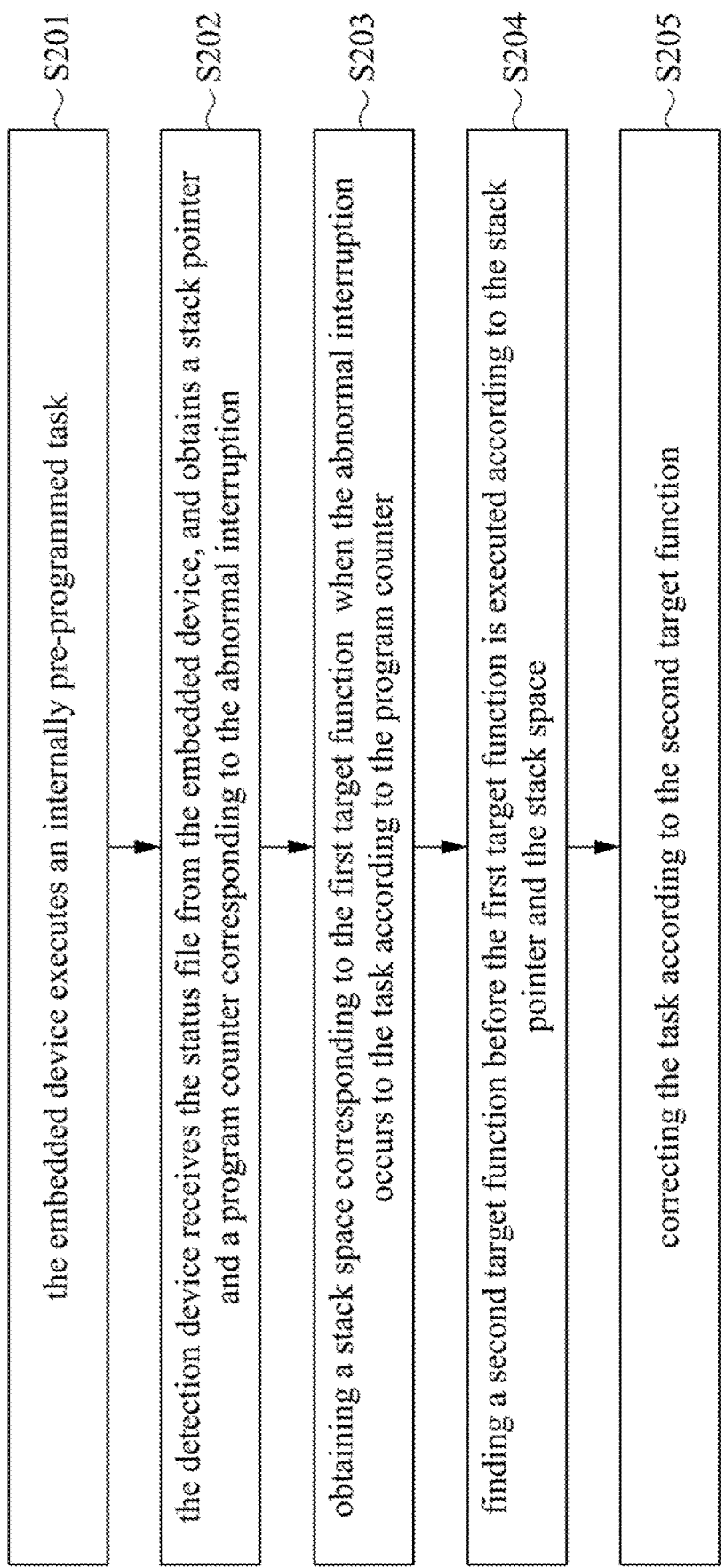
FIG. 2 is a flowchart illustrating an embedded device detection in some embodiments of the present disclosure.

FIG. 2 is a flowchart illustrating an embedded device detection in some embodiments of the present disclosure. FIG. 3A-FIG. 3E are schematic diagrams of identification performed by the detection device 200 in the detection method. In step S201, a detection device 200 is coupled to a embedded device 100, and the embedded device 100 executes an internally pre-programmed task, the task include multiple functions.

In step S202, when an abnormal interruption occurs to the task, the embedded device 100 records an operating status of the memory unit 120 as a status file. Meanwhile, the detection device 200 receives the status file from the embedded device 100, and obtains a stack pointer and a program counter corresponding to the abnormal interrupt.

As shown in FIG. 3A, FIG. 3A is a partial schematic diagram of a status file D1 in some embodiments of the present disclosure. In one embodiment, the status file is a core dump file (e.g. ".coredump" file). The detection device 200 can identify the stack pointer SP (i.e., "SP=0x2C8468" in the figure) and the program counter PC (i.e., "PC=0xA7DA" in the figure) from the status file D1.

In step S203, the detection device 200 obtains a stack space corresponding to the first target function being executed by the processor 110 when the abnormal interruption occurs to the task according to the program counter PC. In some embodiments, the detection device 200 further obtains a mapping file and a list file from the embedded device 100. The mapping file is configured to record all functions related to the task, global variables, and the corresponding memory address and size. The list file is configured to record a current status of the stack space used by all functions in the embedded device 100. Next, the detection device 200 identifies a first target function according to the mapping file, and then identifies the stack space configured by the first target function and size of the stack space from the list file according to the first target function.

As shown in FIG. 3B, FIG. 3B is a partial schematic diagram of a mapping file D2 (".map" file) in some embodiments of the present disclosure. According to value of the program counter PC, the detection device 200 identifies a function name corresponding to the address to obtain the first target function F1. As shown in FIG. 3B, to facilitate understanding, the hexadecimal value is converted to decimal for illustration, but in practical applications, the detection device 200 does not need to convert the data into decimal when making determination: the program counter PC is "0xA7DA" (i.e., 0x0000A7DA), and in the mapping file D2, a starting position of the function "platform_assert_dump" in the stack space is "0x0000a735", and the corresponding decimal is "42805". A starting position of the function "platform_random" is "0x0000a7e1", and the corresponding decimal is "42977". Therefore, the program counter PC is located within a address range of the function "platform_assert_dump."

In some other embodiments, the detection device 200 may identify a starting address of a vector table from the mapping file D2, and the vector table records starting positions of functions associated with abnormally interrupted. The detection device 200 restores the complete vector table according to the starting positions of functions recorded in the vector table to confirm background information of functions. For example, the detection device 200 finds an address of the vector table in the memory unit 120 by the mapping file D2. Then, the detection device 200 reads memory data in the vector table according to the address, so as to construct each function in the vector table.

As shown in FIG. 3C, FIG. 3C is a partial schematic diagram of a list file D3 (".htm" file) in some embodiments of the present disclosure. According to the identified first target function F1 "platform_assert_dump", the detection device 200 can find a corresponding stack space in the list file D3, and its size is "40 bytes."

In step S204, the detection device 200 finds a second target function before the first target function F1 is executed by the processor 110 according to the stack pointer SP obtained in step S202 and the stack space corresponding to the first target function F1 obtained in step S203. In one embodiment, the detection device 200 finds a register (and its storage data) before the first target function F1 is executed from the stack space, which is configured to record an address of the second target function, according to the stack pointer SP and the stack space.

As shown in FIG. 3D, FIG. 3D is a partial schematic diagram of a status file D1 in some other embodiments of the present disclosure. In the aforementioned steps, the detection device 200 already obtains that the stack pointer SP is 0x2C8468 (the corresponding decimal value is 2917480), and obtains that the stack space of the first target function F1 is "40 bytes". The stack pointer SP is configured to indicate a top of the first target function. Therefore, a corresponding position is calculated is calculated forward from the position indicated by the stack pointer SP means the register (because in the stack, the data stored earlier will be located at the lower. The "forward" mentioned here refers to a downward direction in FIG. 3D.) The data recorded in the corresponding position is an address corresponding to the previous function (i.e., the second target function), or the program counter of the previous function (i.e., the second target function.)

As shown in FIG. 3D, each string D1x formed by 8 numbers (e.g., "088084f0" in the upper left) represents 4 bytes. The stack pointer SP is 0x2C8468. Therefore, add 8 bytes from the address "0x2C8460" to find the stack pointer SP "002c8490", which is the topmost address of the first target function. Next, since the stack space of the first target function F1 is "40 bytes", a string "00088c5" calculated ten strings (40 bytes, as shown in the dotted frame in the figure) back from the string "002c8490" is a data stored in the register corresponding to the previous function (i.e., the second target function).

In step S205, the detection device 200 corrects the task according to the second target function. Specifically, the detection device 200 first determines whether there is an error in the second target function, or analyzes whether there is an error in the relative relationship (e.g., calling sequence) between the second target function and the first target function.

In some other embodiments, the detection device 200 finds other functions in sequence before the second target function is executed according to the second target function. For example, the register is obtained by performing the aforementioned steps S201-S204, and the storage of the register records the second target function and the corresponding program counter. Therefore, the detection device 200 can find a stack pointer of the second target function according to the stack pointer and stack space of the first target function. Next, continue to find the previous function (e.g., a third function before the second target function is executed) in a similar method to the aforementioned steps S201-S204.

In addition, in some other embodiments, the detection device 200 further finds other functions before the second target function is executed according to the second target function to confirm the function calling sequence of the task. According to the function calling sequence, the detection device 200 further identifies an initial function when the embedded device 100 executing the task (i.e., a first function to be called when the task is executed). According to the initial function and the function calling sequence, the task content can be comprehensively checked. The detector or the program developer uses the detection device 200 to perform corrections according to the check result. Since those skilled in the art can understand method and principle of correcting the task, it will not be repeated here.

FIG. 3E is a schematic diagram of a function calling sequence FS organized by the detection device 200 in some embodiments of the present disclosure. As shown in the figure, the first target function F1 (i.e., the function being executed when the abnormally interrupt occurs) is "platform_assert_dump", and the second target function F2 is "vAssertHandler".

FIG. 4 is a schematic diagram of a task content in some embodiments of the present disclosure. It should be specially mentioned that the task content shown in FIG. 4 only uses pseudocode to indicate a relationship between each of functions, but it is not used to limit the present disclosure. In one embodiment, the first target function F1 and the second target function F2 are called by the initial function F0. In other words, the initial function F0 is "parent function" of the first target function F1 and the second target function F2. If a call relationship or instruction content among the initial function F0, the first target function F1 and the second target function F2 is wrong, an abnormal interruption may occur in the entire task.

Furthermore, not all tasks can find a complete function calling sequence. In some embodiments, if the initial function F0 does not perform a "push" operation on a space in the memory unit 120 when calling the second target function F2, after the detection device 200 detects the first target function F1 by the aforementioned steps, "the function before the first target function F1" detected by the detection device 200 will be the initial function F0, and the second target function F2 cannot be found/identified directly.

The detection method of the present disclosure can not only find the call relationship between multiple functions to determine an error cause of the task, but also enable the detection device 200 to determine whether there is any leakage of memory data (hereinafter referred to as "analysis method"). The detection device 200 is configured to analyze heaps in the memory unit 120 to confirm whether the data is leaked.

Figure 5:
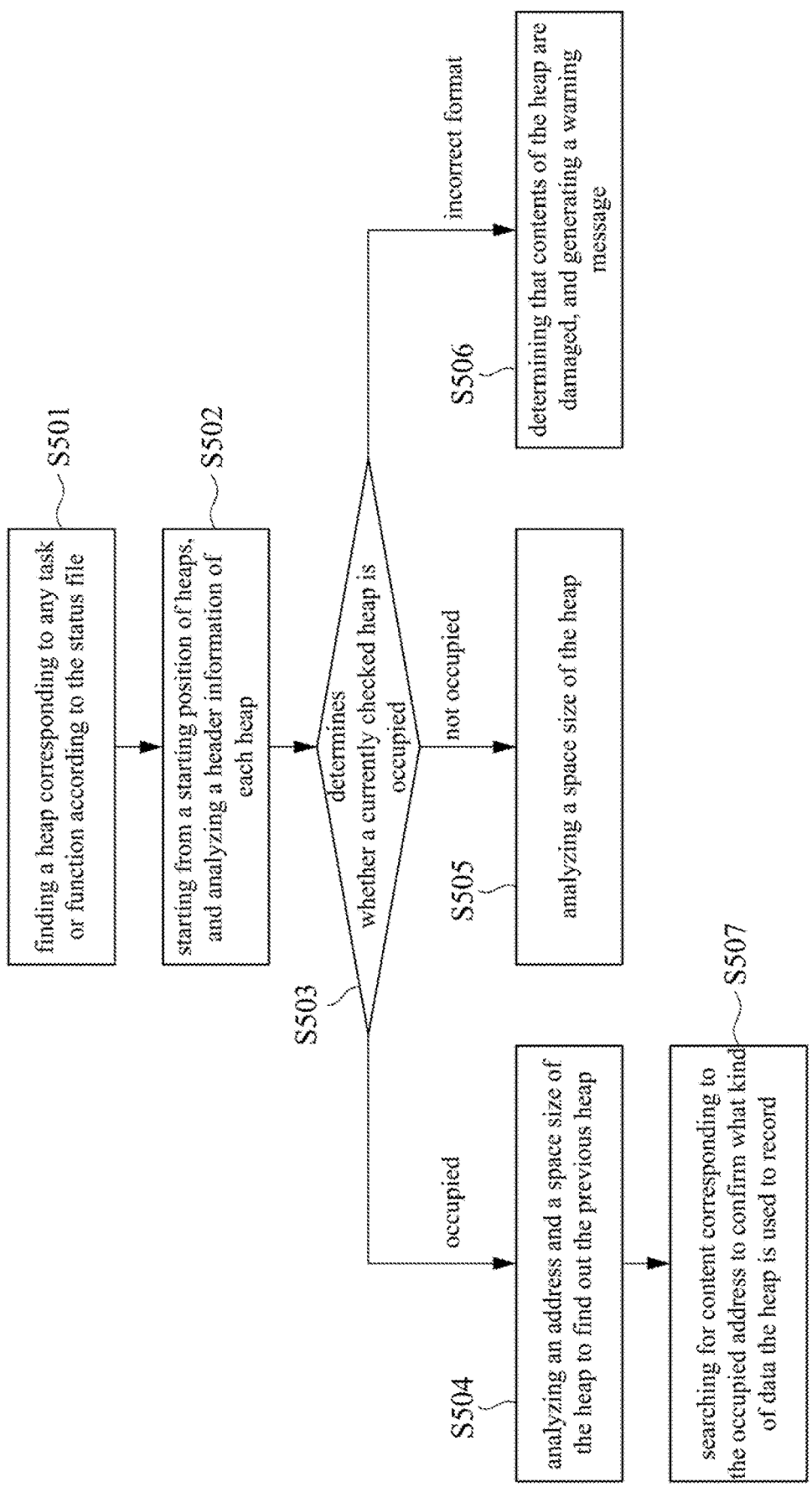
FIG. 5 is a schematic diagram of an analysis method in some embodiments of the present disclosure.

FIG. 5 is a schematic diagram of an analysis method in some embodiments of the present disclosure. In step S501, the detection device 200 or the processor 110 finds a heap corresponding to any task or function according to the status file. Depending on the hardware or software constraints of the embedded device 100, a task or function may correspond to one or more of heap.

In step S502, the detection device 200 or the processor 110 starts from a starting position of the heap(s), and analyzes a header information of each the heap.

In step S503, the detection device 200 or the processor 110 determines whether a currently checked heap is occupied. If the result of step S503 is "occupied", in step S504, the detection device 200 or the processor 110 further analyzes an address and a space size (heap length) of the heap. According to the space size of the heap, it will be able to further find out the previous heap, and then analyze all heaps.

If the result of step S503 is "not occupied", in step S505, the detection device 200 or the processor 110 can still analyze the space size of the heap (heap length). In addition, if the result of step S503 is "incorrect format", in step S506, the detection device 200 or the processor 110 will determine that contents of the heap are damaged and need to be resolved, and generate a warning message.

After finding the address and space size (heap length) of the heap BY the aforementioned step S504, in step S507, the detection device 200 or the processor 110 searches the memory unit 120 for content corresponding to the occupied address according to the occupied address, so as to confirm what kind of data the heap is used to record.

For example, if the content corresponding to the occupied address is "global variable", it means that the address of the heap currently analyzed belongs to a module where the global variable is located. If the content corresponding to the occupied address is "another specific heap", it means that the address of the heap currently analyzed is used to record "a next level module of the current heap".

As mentioned above, if the content corresponding to the occupied address is a "specific stack", it means that the heap currently analyzed is only used for temporary application. In addition, if the content corresponding to the occupied address cannot be searched in the memory unit 120, it means that the currently analyzed heap has a "memory leak" problem and there is a security risk.

In addition, in some other embodiments, when the processor 110 process switching of multiple tasks, the processor 110 can record a switching time and a switching order of tasks, and generate an observation data. The detection device 200 can receive the observation data to analyze and solve potential task abnormality.

The elements, method steps, or technical features in the foregoing embodiments may be combined with each other, and are not limited to the order of the specification description or the order of the drawings in the present disclosure.

It will be apparent to those skilled in the art that various modifications and variations can be made to the structure of the present disclosure without departing from the scope or spirit of the present disclosure. In view of the foregoing, it is intended that the present disclosure cover modifications and variations of this present disclosure provided they fall within the scope of the following claims.

What is claimed is:

1. An embedded device detection method, comprising:
   executing a task, by an embedded device, wherein the task comprises a plurality of functions;
   when an abnormal interruption occurs to the task, obtaining, by a detection device, a stack pointer and a program counter corresponding to the abnormal interruption from a status file, wherein the program counter is configured to record a memory address in use when the abnormal interruption occurs to the task, wherein the abnormal interruption indicates that an error occurs in execution or call of a function;
   obtaining a stack space corresponding to a first target function being executed when the abnormal interruption occurs to the task according to the program counter;
   forwarding a position indicated by the stack pointer for a size of the stack space in the status file to find a register which is configured to record an address of an second target function before the first target function is executed; and
   correcting the task according to the second target function.

2. The embedded device detection method of claim 1, wherein obtaining the stack space corresponding to the first target function being executed according to the program counter when the abnormal interruption occurs to the task comprises:
   identifying the first target function from a mapping file according to the program counter; and
   identifying the stack space where the first target function is configured from a list file according to the first target function.

3. The embedded device detection method of claim 1, wherein obtaining the stack pointer and the program counter corresponding to the abnormal interruption comprises:
   when the abnormal interruption occurs to the task, receiving, by the detection device, the status file from the embedded device to identify the stack pointer and the program counter.

4. The embedded device detection method of claim 1, wherein correcting the task according to the second target function comprises:
  finding a function calling sequence before the second target function is executed according to the second target function;
  identifying an initial function according to the function calling sequence when the embedded device executes the task; and
  correcting the task according to the initial function and the function calling sequence.

5. A task abnormality detection system, comprising:
  an embedded device comprising a processor and a memory unit, wherein the processor is configured to execute a task, the task comprises a plurality of functions; and
  a detection device coupled to the embedded device, and configured to receive a status file to obtain a stack pointer and a program counter when an abnormal interruption occurs to the task, wherein the detection device is further configured to obtain a stack space corresponding to a first target function being executed when the abnormal interruption occurs to the task according to the program counter, wherein the abnormal interruption indicates that an error occurs in execution or call of a function; and
  wherein the detection device is further configured to forward a position indicated by the stack pointer for a size of the stack space in the status file to find a register which is configured to record an address of an second target function before the first target function is executed to correct the task.

6. The task abnormality detection system of claim 5, wherein the detection device is configured to identify the first target function from a mapping file according to the program counter, and is configured to identify the stack space where the first target function is configured from a list file according to the first target function.

7. The task abnormality detection system of claim 5, wherein the program counter is configured to record a memory address in use when the abnormal interruption occurs to the task.

8. The task abnormality detection system of claim 5, wherein the detection device is configured to find a function calling sequence before the second target function is executed according to the second target function, and is configured to identify an initial function according to the function calling sequence when the embedded device executes the task.

9. An embedded device detection method, comprising:
  executing a task, by an embedded device, wherein the task comprises a plurality of functions;
  when an abnormal interruption occurs to the task, recording, by the embedded device, a operating status of the embedded device as a status file, wherein the abnormal interruption indicates that an error occurs in execution or call of a function;
  obtaining, by a detection device, a stack pointer and a program counter corresponding to the abnormal interruption from the status file, wherein the program counter is configured to record a memory address in use when the abnormal interruption occurs to the task;
  identifying a first target function being executed when the abnormal interruption occurs to the task according to the program counter;
  obtaining a stack space corresponding to the first target function according to the program counter;
  forwarding a position indicated by the stack pointer for a size of the stack space in the status file to find a register which is configured to record an address of an second target function before the first target function is executed; and
  correcting the task according to the second target function.

10. The embedded device detection method of claim 9, wherein obtaining the stack space corresponding to the first target function comprises:
  identifying the first target function from a mapping file according to the program counter; and
  identifying the stack space where the first target function is configured from a list file according to the first target function.

11. The embedded device detection method of claim 9, wherein correcting the task according to the second target function comprises:
  finding a function calling sequence before the second target function is executed according to the second target function;
  identifying an initial function according to the function calling sequence when the embedded device executes the task; and
  correcting the task according to the initial function and the function calling sequence.

* * * * *